United States Patent [19]

Wood

[11] 4,135,958

[45] Jan. 23, 1979

[54] METHOD OF LINING A PASSAGEWAY WITH A RESIN ABSORBENT TUBE

[75] Inventor: Eric Wood, Ossett, England

[73] Assignee: Insituform International Inc., England

[21] Appl. No.: 865,375

[22] Filed: Dec. 29, 1977

[30] Foreign Application Priority Data

Jan. 25, 1977 [GB] United Kingdom ............... 2895/77

[51] Int. Cl.² ............................................. B29C 17/00
[52] U.S. Cl. ........................................ 156/199; 29/234; 29/235; 29/421 R; 29/451; 118/44; 118/56; 118/408; 118/419; 118/DIG. 10; 156/287; 156/294; 156/574; 156/499; 264/510; 427/207 R; 427/230; 427/235
[58] Field of Search ............... 156/156, 199, 287, 294, 156/499, 574, 575, 196; 427/207 R, 230, 235; 118/44, 56, 317, 407, 408, 419, 424, DIG. 10; 29/234, 235, 421 R, 451; 264/94, 95

[56] References Cited

U.S. PATENT DOCUMENTS

| | | | |
|---|---|---|---|
| 3,230,129 | 1/1966 | Kelly | 156/287 |
| 3,381,718 | 5/1968 | Darrow | 156/287 |
| 3,433,214 | 3/1969 | Silverman | 156/287 |
| 3,474,755 | 10/1969 | Voo | 118/44 |
| 4,009,063 | 2/1977 | Wood | 156/294 |
| 4,032,677 | 6/1977 | Ichioka et al. | 118/419 |
| 4,064,211 | 12/1977 | Wood | 156/287 |

Primary Examiner—Jerome W. Massie
Attorney, Agent, or Firm—Wolf, Greenfield & Sacks

[57] ABSTRACT

A lining comprising a resin absorbent tube having on the outside a fluid impermeable membrane everted into the passageway to line same using fluid pressure. The resin absorbent material is soaked in resin by trapping a quantity of resin in the lining before it everts in the passageway, and the resin is cured after the lining is everted into the passageway surface, preferably by a curing means following the everting lining along the inside of the passageway.

5 Claims, 1 Drawing Figure

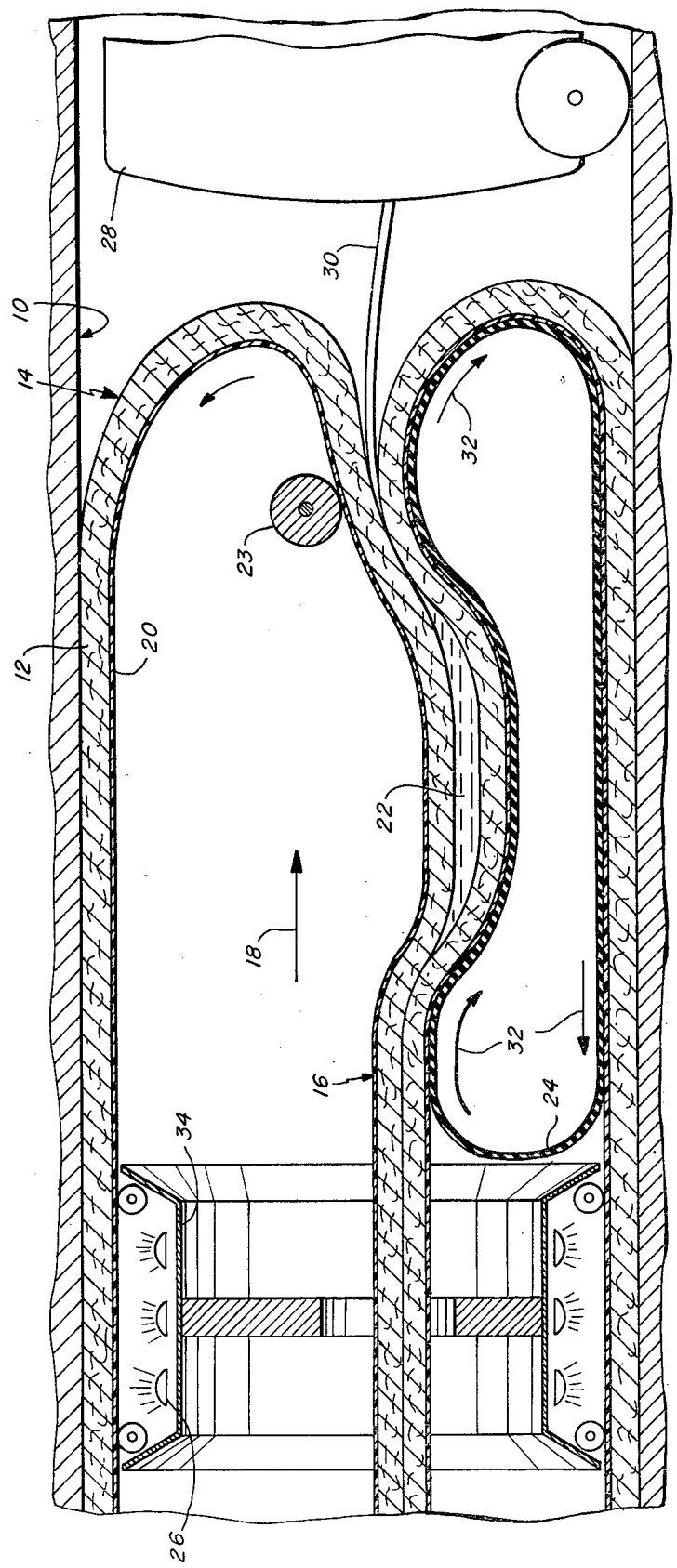

METHOD OF LINING A PASSAGEWAY WITH A RESIN ABSORBENT TUBE

This invention relates to a method of lining passageways. By the expression, "passageways", as used herein is intended to mean the bores of ducts, pipes and channels, which may be above or below ground, as well as underground tunnels, passages, sewers, shafts, and the like.

In U.S. Pat. No. 4,009,063, it is disclosed that in order to line a passageway, a tubular lining structure is formed comprising an inner impermeable membrane, a layer of resin absorbent felt material, and an outer impermeable membrane. The top material is thoroughly impregnated with resin and in the process, before the resin has had sufficient time to cure, the tubular structure is inflated by any suitable fluid such as gas or liquid, against the surface to be lined, and it is held in this position whilst curing is effected. The resin when cured forms a hard self-supporting rigid liner, and the inflating pressure can be removed leaving the lining in situ.

In U.S. patent application Ser. No. 628,850, now U.S. Pat. No. 4,064,211, there is disclosed a particular method for the insertion of an impregnated tubular liner which facilitates the handling of same. It is to be appreciated that when a tubular liner having a resin absorbent felt is in the condition in which the felt is thoroughly soaked with resin, it is an extremely heavy article, especially if it is of long length e.g. of the order of two or three hundred meters. That U.S. Pat. No. 4,064,211 discloses that the tubular liner can be inserted by anchoring one end of the liner and everting the liner into the passageway using a liquid. The liquid serves two functions, it inflates the everted liner against the passage to be lined and maintains it in that position, and secondly the specific gravity of the liquid is so related to the materials and resin of the liner that the portion of the liner which is passing through the already everted portion is buoyantly supported by the liquid, ensuring that the heavy liner as it is passing into the already everted portion of the liner will not scrape along the already everted portion. In this connection, it is also possible to include in the liquid a lubricant such as a soap in order to facilitate slippage of the impregnated liner into the passageway.

The present invention is concerned with a novel method of inserting liners of the type and for the purposes set forth above, but wherein the disadvantage of having to use liquid as the supporting medium is avoided.

A further object of the invention is to obviate the need to impregnate the resin absorbent material sooner than it need be. If it is impregnated too soon, there is the mechanical problem of handling it and there is also the problem of premature curing of the resin. If the resin cures before the lining is in position or before the lining is fully inflated, the lining is either ruined or the partly inflated lining restricts the passageway.

Another object is to provide a method wherein control of the supply of the resin to the absorbent material is more positive than heretofore.

The method of the invention is specially adapted for the lining of large diameter passageways, e.g. passageways in which personnel can move around.

According to the present invention there is provided a method of lining a passageway, wherein a tubular lining of resin absorbent material is everted into the passageway by means of fluid pressure, a quantity of resin is located inside the lining before it everts in the passageway so that the resin soaks the resin absorbent material, and the lining, before eversion, is supported at the location of said quantity of contained resin.

By arranging for a quantity of resin to be inside the lining before it everts for the soaking operation, there is less likelihood of the resin curing before the lining is in position, and of course the main requirement for support of the lining is at the location of the quantity of resin, the remainder of the lining, prior to eversion being capable of much easier handling because its weight per unit length is so much less.

Preferably, the resin absorbed by the absorbent material after it is everted onto the passageway is cured by a curing means travelling along the inside of the passageway behind the everting lining.

Such curing means suitably comprises heating means, such as infra red heaters.

In another preferred feature, the quantity of resin contained in the lining before eversion is maintained from a tank of resin which moves along the passageway before eversion of the lining.

A suitable form of means for supporting the lining at the location of the quantity of resin may comprise a balloon which rolls along the inside of the passageway under the lining at the location of said quantity of resin.

In some cases it may be desirable to pinch the lining immediately before eversion of the lining in order evenly to spread the resin throughout the resin absorbent material.

The lining may be of the nature set out in said U.S. Pat. No. 4,009,063 or U.S. Pat. No. 4,064,211.

An embodiment of the present invention will now be described, by way of example, with reference to the accompanying drawing, of which the single FIGURE illustrates, in sectional elevation, the process according to the present invention.

Referring to the drawing the tubular lining which is to line the passageway surface 10 comprises a tube 12 of resin absorbent material, such as a needled felt of synthetic fibres. Essentially, this tube is everted at an everting station 14 which travels along the passageway 10, the propulsion force being obtained by pressuring the interior of the tube 14 by means of air under pressure, causing the central portion 16 of the tube to travel along the passageway 10 in the direction of arrow 18. The arrow 18 also indicates the general direction of the air-flow into the tube to evert same. The tube 14 is provided with a membrane 20 which may be a preformed sheet or a coating applied to tube 12, and which is relatively impermeable to air, enabling the eversion of the tube 12 to take place effectively. Inside the tube 12 before it everts, there is formed a resin reservoir 22 which is supported by a large bag or balloon 24 filled with a fluid medium such as air or water. By so providing the resin in reservoir 22, the whole of the cross section of the tube 12 is impregnated with the resin as the tube moves as indicated by arrow 18. Before the tube everts, a pressure roller 23 presses the tube flat, causing any excess resin to run back into reservoir 22. Thus, when the tube 12 is presented to the surface 10, it is impregnated with an effectively immersed in resin. In this example, a resin which cures under the action of light is used, and following the everting tube in the passageway is a bank of illumination and radiation sources 26 to effect the cure of the resin and the completion of the lining operation. Make up resin is supplied from a bulk container 28 which moves along the passageway 10 ahead of the everting tube, and supplies make up resin through supply tube 30 which is located in the centre of the everting tube at station 14 as shown.

In use, the container 28 and the bank of lamps 26 moves along the passageway, on wheels if desired, in phase with the everting tube 14, and the bag 24 simply rolls over upon itself as indicated by arrows 32. It will be appreciated that whilst this method is intended to be continuous, there is no problem if the method is stopped temporarily, as it is simply a matter of switching off the lights 26 if necessary. In the example shown the lights are provided with a shield 34 so that indeed only a particular section of lining tube is illuminated at any one time. The lining operation can be stopped for considerable periods of time without any deleterious effect.

Furthermore handling of the lining is easier than is the case where the lining is provided with the resin, before being inserted in the passageway, because it will be much lighter.

The resin absorbent material will preferably be a felt, such as polyester, polyethonal, polypropylene felt, whilst the membrane may be P.V.C., polyurethane, polyethelene or polypropylene. The resin may be for example polyester, epoxy or polyurethane.

I claim:

1. A method of forming a tubular resin impregnated lining in a passageway, comprising the steps of
    (a) causing a tube of resin absorbent material to evert into the passageway by applying fluid pressure to the interior of the everted tube to force the uneverted portion of the tube to move into the passageway through the everted portion of the tube,
    (b) causing a reservoir of resin to be located in the uneverted portion of the tube which is just behind the portion of the tube that is everting into the passageway whereby the resin absorbent material is soaked by the resin in the reservoir just before that material everts, and
    (c) supporting the uneverted tube at the location of the reservoir of resin by means that move along the passageway as the tube everts.

2. The method according to claim 1, further comprising the step of
    (d) disposing means inside the everted tube which moves along the passageway as the tube everts and causes the resin in the absorbent material to cure and form a rigid lining in the passageway.

3. The method according to claim 1, further comprising the step of
    (d) disposing a resin containing tank in the passageway from which resin is added to the reservoir of resin in the uneverted tube as that tube everts into the passageway.

4. The method according to claim 1, wherein in step (c) a balloon or gas filled bag is placed within the everted tube to support the uneverted tube at the location of the resin reservoir and the balloon or gas filled bag rolls along the inside of the everted tube as that tube everts into the passageway.

5. The method according to claim 1, further including the step of
    (d) causing the uneverted tube to be pinched just before the tube everts whereby the resin absorbed from the reservoir is evenly spread through the resin absorbent material.

* * * * *